(12) United States Patent
Husemoen et al.

(10) Patent No.: US 7,459,490 B2
(45) Date of Patent: *Dec. 2, 2008

(54) BINDER FOR MINERAL WOOL PRODUCTS

(75) Inventors: Thor Husemoen, Roskilde (DK); Erling Lennart Hansen, Gentofte (DK); Povl Nissen, Olstykke (DK)

(73) Assignee: Rockwool International A/S, Hedehusene (DK)

( * ) Notice: Subject to any disclaimer, the term of this patent is extended or adjusted under 35 U.S.C. 154(b) by 251 days.

This patent is subject to a terminal disclaimer.

(21) Appl. No.: 11/045,537

(22) Filed: Jan. 28, 2005

(65) Prior Publication Data
US 2005/0137318 A1  Jun. 23, 2005

Related U.S. Application Data

(63) Continuation of application No. 10/311,101, filed as application No. PCT/EP01/06879 on Jun. 15, 2001, now Pat. No. 6,849,683.

(30) Foreign Application Priority Data
Jun. 16, 2000 (EP) .................................. 00202103

(51) Int. Cl.
*C08J 5/14* (2006.01)
(52) U.S. Cl. ........................ 523/153; 523/156; 523/200; 524/249

(58) Field of Classification Search ................. 523/153, 523/156, 200; 524/249
See application file for complete search history.

(56) References Cited

U.S. PATENT DOCUMENTS

| | | | | |
|---|---|---|---|---|
| 4,076,917 | A * | 2/1978 | Swift et al. | 525/329.5 |
| 5,032,431 | A * | 7/1991 | Conner et al. | 427/389.8 |
| 5,763,524 | A * | 6/1998 | Arkens et al. | 524/547 |
| 6,071,994 | A | 6/2000 | Hummerich et al. | |
| 6,099,773 | A | 8/2000 | Reck et al. | |
| 6,146,746 | A | 11/2000 | Reck et al. | |
| 6,596,386 | B1 | 7/2003 | Reck et al. | |
| 6,699,945 | B1 | 3/2004 | Chen et al. | |
| 6,849,683 | B2 * | 2/2005 | Husemoen et al. | 524/513 |
| 7,067,579 | B2 | 6/2006 | Taylor et al. | |

FOREIGN PATENT DOCUMENTS

| | | |
|---|---|---|
| EP | 0 583 086 B2 | 2/1994 |
| EP | 0882094 B1 | 12/1998 |

* cited by examiner

*Primary Examiner*—Bernard Lipman
(74) *Attorney, Agent, or Firm*—The Webb Law Firm

(57) ABSTRACT

Process for providing a binder for mineral wool products, said process comprising the steps of: mixing together under reactive conditions a carboxylic acid with an alkanolamine, whereby optionally these are firstly mixed to provide a resin, which resin is subsequently reacted with a separate carboxylic acid group containing polymer.

31 Claims, No Drawings

BINDER FOR MINERAL WOOL PRODUCTS

CROSS REFERENCE TO RELATED APPLICATIONS

This application is a continuation application of U.S. patent application Ser. No. 10/311,101 filed Dec. 12, 2002, which is the U.S. national phase of International Application No. PCT/EP01/06879 filed Jun. 15, 2001, which designated, inter alia, the United States, and which claims priority to European Application No. 00202103.8 filed Jun. 16, 2000.

BACKGROUND OF THE INVENTION

1. Field of the Invention

The invention relates to a process for providing a binder for mineral fibers, i.e. man made vitreous fibers, for example glass, slag or stone wool, a binder obtainable via such a process, and a mineral wool product comprising such a binder.

2. Description of Related Art

Mineral wool products generally comprise mineral fibers bonded together by a cured thermoset polymeric material. One or more streams of molten glass, slag or stone are drawn into fibers and blown into a forming chamber where they are deposited as a web on to a travelling conveyer. The fibers, while airborne in the forming chamber and while still hot are sprayed with a binder. The coated fibrous web is then transported from the chamber to a curing oven where heated air is blown through the mat to cure the binder and rigidly bond the mineral wool fibers together.

Phenol-formaldehyde binders are widely used in the mineral wool industry since they have a low viscosity in the uncured state, yet still form a rigid thermoset polymeric matrix for the mineral fibers when cured.

However the use of phenol formaldehyde binders is becoming increasingly undesirable due to the use and release of environmentally unfavourable chemicals during the process.

The use of β-hydroxyalkylamides to cure polycarboxy polymers such as polyacrylic acid in order to provide a binder is known.

A problem with polyacrylics cured by β-hydroxyalkylamides is that mineral wool products bound with such a resin normally exhibit good mechanical properties before ageing, but after exposure to high humidities and increased temperatures, for example above 40 degrees centigrade, the mechanical properties are drastically reduced.

There is therefore a desire to develop a binder which improves on the known binders.

SUMMARY OF THE INVENTION

An object of the present invention is to provide an alternative binder aimed at overcoming one or more of these problems.

According to a first aspect of the present invention, there is provided a process for providing a binder for mineral wool products said process comprising the steps of:

mixing together under reactive conditions a carboxylic acid with an alkanolamine.

The resulting binder when utilized for a mineral wool product, provides the mineral wool product with desirable mechanical properties after ageing, subjection to tear strain and exposure to high humidities and increased temperatures.

The carboxylic acid and the alkanolamine are preferably firstly mixed together under reactive conditions to provide a resin, which resin optionally is subsequently mixed with a separate carboxylic acid group containing polymer to form a binder.

The carboxylic acid is preferably a di-, tri-,or tetra carboxylic acid having a molecular weight of about 1000 or less, preferably about 500 or less, and most preferably about 200 or less, most preferably a di-carboxylic acid having the general formula:

$$COOH-(CR_1R_2)_n-COOH$$

wherein $n \geq 2$ and preferably $n \geq 4$, and wherein $R_1$ and $R_2$ are independently selected from H or a lower alkyl group, preferably a methyl or ethyl group.

The carboxylic acid is preferably selected from the group consisting essentially of: adipic acid, citric acid, trimellitid acid, sebacic acid, azelaic acid, and. succinic acid and is most preferably adipic acid.

The alkanolamine is preferably selected from the group comprising di, and tri-alkanolamines, and can be a secondary beta-hydroxy alkylamine, preferably an N-substituted alkanolamine selected from the group consisting essentially of, di-ethanolamine, 1-(m)ethyldiethanolamine, n-butyldiethanolamine, 3-amino-1,2-propanediol, 2-amino-1,3,-propanediol, tris(hydroxymethyl)aminomethane, most preferably being diethanolamine.

The mole ratio of the carboxylic acid to the alkanolamine in the binder preferably lies in the range of 0.1-1:1-0.1 and the weight percentage of the carboxylic acid group containing polymer in the binder can lie in the range of 0.5-50, for example 10-40, preferably 15-30, most preferably about 20.

The alkanolamine is preferably firstly heated to around 60° C., whereafter the carboxylic acid is added and the temperature of this mixture is subsequently raised to about at least 90° C., preferably a temperature lying in the range of about 95-200, for example about 120-150° C.

The carboxylic acid group containing polymer preferably has a molecular weight lying in the ranges of 1000-300000, for example 1000-250000, preferably 1000-200000 most preferably having a molecular weights of around 60000, around 100000 and around 190000.

The carboxylic acid group containing polymer preferably comprises one or more of the following: polyacrylic acid, polymethacrylic acid, polymaleic acid and/or co-polymers thereof, preferably being selected from one or more of the following:

HF-05A, Rohm & Haas, an acrylic emulsion,

ACUSOLE 190™, Rohm & Haas, a styrene/acrylic emulsion,

ACUMER 1510™, Rohm & Haas, poly(acrylic acid) with an average MW ca. 60,000, 41.600-2, from the Aldrich Chemical Company Inc., poly (acrylic acid) with an average MW ca. 250,000.

One or more of the following additives can be added to the binder:

a coupling agent, for example an aminosilane, preferably gamma-aminopropyltriethoxysilane, a polymerisation accelerator, a curing accelerator and optionally further standard mineral wool binder additives.

In order to improve the water solubility of the resin a base might be added till a pH up to 7. The weight % of base in the resin reaction mixture, typically the weight % of the base calculated by weight of the solids in the reaction mixture, lies in the range of up to 20%, preferably up to 10%, more preferably 1-5% and most preferably 4%. The base is preferably mixed with a polyacrylic acid and added to the resin reaction mixture after the resin reaction is preferably stopped by water addition. The weight % of polyacrylic acid in the mixture lies in the range up to 50%, for example 40%, preferably 30% and most preferably up to 25%. Stopping the resin reaction is preferably accomplished by adding in an amount equal to the weight of the solids in the resin mixture, 25% more than the weight of solids in the resin mixture, or 50% more than the weight of solids in the resin mixture. Accordingly, the base can first be added after the resin is prepared. Suitable bases include $NH_3$, DEA, TEA, optionally mixed with a polyacrylic acid such as Acumer 1510 produced by Rohm and Haas, MW about 60.000.

Further characteristics are referred to in claims 18-23.

In order to improve the aging constancy properties a silane may be added. The silane usually but is not restricted to be added during the binder preparation or directly (separately) at the line. The amount would normally be in the range from 0.1% to 5% (0.2%-3%) and is preferably measured by the weight of the resin solids. Preferred amount is approximately 1%. The silane is most preferably prehydrolysed gamma-aminopropyltriethoxysilane (VS 142/Vitco).

According to further aspects of the present invention there is provided a binder obtainable according to this process, a process for providing a mineral wool product, a mineral wool product and the use of a reaction mixture of an alkanolamine and a carboxylic acid, optionally mixed with a carboxylic acid group containing polymer, as a binder for a mineral wool product.

The invention will now be further illustrated by way of the following examples and results.

DETAILED DESCRIPTION OF THE PREFERRED EMBODIMENTS

EXAMPLE 1

158 g diethanolamine was placed in a 1-liter glass reactor provided with a double jacket and an agitator. Temperature of the diethanolamine was raised to 60° C. whereafter 99 g adipic acid was added slowly. The temperature was raised to 95° C. After a reaction time of 1 hour at about 95° C. the reaction was stopped by the addition of 200 g water. The reaction product was a clear, colourless, low viscous liquid, dilutable with water.

EXAMPLE 2

158 g diethanolamine was placed in a 1-liter glass reactor provided with a double jacket and an agitator. Temperature of the diethanolamine was raised to 60° C. whereafter 175 g adipic acid was added slowly. The temperature was raised to 95° C. After a reaction time of 1 hour at about 95° C. the reaction was stopped by the addition of 200 g water. The reaction product was a clear, colourless, low viscous liquid, dilutable with water.

EXAMPLE 3

67.2 g triethanolamine was mixed with 33.0 g adipic acid at room temperature. After the solution had turned clear 60 ml temperate water was added. The mixture was a clear, colourless, low viscous liquid, dilutable in water.

EXAMPLE 4-6

Resins were made using the same procedure as in example 1. The following amounts of chemicals were used:

TABLE 1

|  | Alkanolamine | Polycarboxylic acid | Water |
|---|---|---|---|
| Example 4 | 158 g Diethanolamine | 243 g Azelaic Acid | 200 ml |
| Example 5 | 158 g Diethanolamine | 141 g Sebacic Acid | 200 ml |
| Example 6 | 158 g Diethanolamine | 89 g Succinic Acid | 200 ml |

EXAMPLE 7

158 g diethanolamine was placed in a 1-liter glass reactor provided with a double jacket and an agitator. The temperature of the diethanolamine was raised to 60° C. whereafter 99 g adipic acid was slowly added. The temperature was subsequently raised to about 130° C., the temperature-being maintained between 128 and 135° C. After a reaction time of 3 hours the reaction was stopped by the addition of water.

All the produced reaction products in examples 4-7 were clear colourless low viscous liquids, dilutable in water.

EXAMPLE 8

Preparation and testing of selected binder samples to evaluate the binding strength towards shots with mineral fibre composition (Grit bar test). As shots are considered unfiberized fiber material with identical composition as the fibers.

Shots with size between 0.25 and 0.5 mm diameter were used to make bars with dimensions 140 mm×25 mm×10 mm.

A binder solution was prepared comprising 80% of the resins from examples 1-7 mixed at room temperature with 20% of a commercial polyacrylic resin.

As polyacrylic acids were used the commercial types from Rohm & Haas: HF-05A, Acusole 190 and Acumer 1510, and a polyacrylic acid with an average mole weight of 250.000 (Aldrich Chemical Company Inc. 41.600-2).

For making the bars 90 ml binder solution with 15% solids content and 0.2% silane coupling agent of binder solids were mixed with 450 g shots.

The coupling agent was gamma-aminopropyltriethoxysilane.

Out of the 450 g shots mixed with binder solution, 8 bars were made which were cured 2 hours at 200° C. in an incubator.

Four of the bars were broken directly (dry strength), the other 4 are placed 3 hours in 80° C. water before they are broken (wet strength).

The binding strength was determined by breaking the bars in a measuring device, where the clamping length is 100 mm and the velocity of the compressing beam was 10 mm/min. Using the clamping length, width and thickness of the bars, the bending strength was determined in $N/mm^2$.

For comparison a commercial product Primid XL-552 from EMS Chemie AG was used. Primid XL-552 is the reaction product of a dimethylester of adipic acid and diethanolamine, whereby the inventors have shown that 100% Primid is not curable since only free OH-groups are present which do not cross-link. A mixture of 80% primid and 20% PAA yielded a very fast curing time (45 s (HF-05) and 20s (Mw 250,000) at 200° C.) but the products have no remaining strength after ageing. The results are shown in table 2.

TABLE 2

| Resin | Polyacrylic acid | Unaged strength N/mm² | Aged strength N/mm² | Remaining strength (aged/unaged) |
|---|---|---|---|---|
| 80% Example 1 | 20% HF05 | 9.6 | 2.0 | 21% |
| 80% Example 1 | 20% PAA MW 250000 | 9.7 | 4.6 | 47% |
| 80% Example 2 | 20% HF05 | 10.0 | 5.3 | 53% |
| 80% Example 2 | 20% PAA MW 250000 | 6.9 | 4.5 | 66% |
| 80% Example 3 | 20% HF05 | 7.7 | 6.2 | 81% |
| comparison example 80% Primid XL-552 | 20% HF05 | 3.6 | 0 | 0% |
| 60% Example 2 | 40% HF05 | 8.1 | 4.0 | 49% |
| 20% Example 2 | 80% HF05 | 8.5 | 1.5 | 18% |
| 20% Example 2 | 80% PAA, Mw 250,000 | 4.5 | 4.0 | 89% |
| 80% Example 4 | 20% PAA MW 2,000 | 6.6 | 3.1 | 47% |
| 80% Example 5 | 20% PAA Mw 2,000 | 8.0 | 4.7 | 59% |
| 80% Example 6 | 20% PAA Mw 250,000 | 7.5 | 0.4 | 5% |
| 80% Example 7 | 20% Acusol 190 | 8.0 | 2.4 | 30% |
| 80% Example 7 | 20% Acumer 1510 | 9.2 | 3.2 | 35% |

Measurement of Curing Times for Selected Examples

A few droplets of the binder to be examined were placed on a microscope cover glass. The glass was dried in a heating cupboard at 90° C. for 45 min.

After drying the cover glass was placed on a heating stage at 250° C. and while stirred with a piece of metal wire (straightened paper-clips) the time was measured until the binder was cured.

The results are shown in table 3.

TABLE 3

| Resin | Polyacrylic acid | Curing time 200° C. | Curing time 250° C. |
|---|---|---|---|
| 80% Example 1 | 20% HF05 | — | 90 s |
| 80% Example 1 | 20% PAA, Mw 250,000 | — | 25 s |
| 80% Example 2 | 20% HF05 | 140-160 s | 45 s |
| 80% Example 2 | 20% PAA, Mw 250,000 | — | 25 s |
| 80% Example 4 | 20% HF05 | 173 s | 43 s |
| 80% Example 5 | 20% HF05 | 285 s | 50 s |
| 80% Example 7 | 20% Acusol 190 | 35 s | — |
| 80% Example 7 | 20% Acumer 1510 | 30 s | — |

As polyacrylic acids were used the commercial types from Rohm & Haas: HF-05A, Acusole 190 and Acumer1510, and two pure polyacrylic acids with average mole weights of 2000 and 250,000 respectively (Aldrich Chemical Company Inc. 32,366-7 and 41,600-2)

EXAMPLE 9

20.8 kg Diethanolamine were transferred to a 80 liter steel reactor provided with an agitator and a heating/cooling jacket and heated to 60° C. 23.0 kg Adipic Acid were added to the reactor in 5 portions and the temperature raised to a reaction temperature of 95° C. After reaction for 1 hour 26.3 kg temperate water were added, whereafter the resin was cooled to room temperature.

The resulting resin was a clear colourless low viscous liquid dilutable with water.

At room temperature 80% of the above resin was mixed with 20% of a commercial Polyacrylic resin from Rohm & Haas: HF-05.

The produced resin was after mixing with water and addition of 0.2% of a silane coupling agent used as a binder in a production trial on a standard stonewool line. The product produced was a standard slab with a density of 100 kg/m³, 100 mm thickness and with approximately 3% binder content.

As a comparison a trial was made with two commercial polyacrylic resins. HF-05 and QRXP 1513 both from Rohm & Haas. Both resins were diluted with water and added 0.2% of a silane coupling agent.

The coupling agent was γ-aminopropyltriethoxysilane.

The mechanical strengths were measured according to EN1607 (delamination strength). The delamination strength was measured on both unaged and after exposure to high humidity and increased temperature in a climate chamber (70° C./95 RH; aged samples)

Results from the testing are shown in tables 4, 5 and 6 below.

TABLE 4

| Binder | Binder content | Oil content | Density Kg/m³ | Delamination strength Unaged kPa | Delamination strength Aged (70° C./95% RH) kPa | Remaining strength |
|---|---|---|---|---|---|---|
| Binder according Example 8 | 3.1% | 0.2% | 98 | 9.7 | 4.0 | 41% |
| Comparison example HF-05 | 3.3% | 0.2% | 101 | 7.2 | 1.3 | 18% |

TABLE 4-continued

| Binder | Binder content | Oil content | Density Kg/m³ | Delamination strength Unaged kPa | Delamination strength Aged (70° C./95% RH) kPa | Remaining strength |
|---|---|---|---|---|---|---|
| Comparison example QRXP | 3.1% | 0.2% | 98 | 12.6 | 1.6 | 13% |
| Comparison example Standard phenolic resin | 3.3% | 0.2% | 99 | 10.9 | 4.6 | 42% |

EXAMPLE 10

TABLE 5

| Ex | Amine | Poly-acid | Water | Accelerator | Base | Reaction conditions | Curing time 200° C. | Curing time 250° C. | Silane [%] |
|---|---|---|---|---|---|---|---|---|---|
| 10 | 25.5 kg DEA | 17.6 kg ADP | 32.51 | 20% PAA | DEA | 60°/130° for 3 hours | 140 s | 35 s | 0.2 |

TABLE 6

| Ex | Binder content [%] | Oil content [%] | Density [kg/m³] | Delamination strength, unaged [kPa] | Delamination strength, aged (70° C./95% RH) [kPa] | Remaining strength [%] |
|---|---|---|---|---|---|---|
| 10 | 3.5 | 0.2 | 140 | 10.1 | 3.3 | 36 |

EXAMPLE 11

Resin:

116 kg DEA was transferred to a 400 l reactor and heated to 60° C. and stirred.

16.3 kg ADP was added and the mixture heated and reacted at 130° C. for 60 minutes.

Thereafter cooled to 85° C. and added (THPA) 33.8 kg. Thereafter 82.5 kg PTA was added and the temperature raised to 130° C. and kept there for 120 minutes.

Thereafter the reaction mixture was cooled to 110° C. and 100 kg water added.

The temperature stabilised at approx. 50° C. The mixture was stirred for further 15 minutes until homogenous.

The resin was cooled and transferred to a storage tank.

Resin solids content 62.2% determined at 200° C. Rest monomers 39% DEA of added, 12% THPA of added, 25% PTA of added. Average molweight about 600.

On a sample, a factory trial was carried out, whereby 4% DEA and 25% solids Acumer 1510 calculated on resin solids, 0.4% of sum solids silane and water to 25% solids content, was added and analysed.

Results of Factory Trial

Binder yield 60%

Delamination strength (EN 1607) 13.4 kPa (Terraenbatts Industri)—Aged 3.6 kPa (70° C./95% RH)

Tensile strength 5.5 kPa (Flexi A Batts)

EXAMPLE 12

Resin 24 kg DEA was transferred to a 80 l reactor and heated to 60° C. and stirred.

6.7 kg ADP was added and the mixture heated and reacted at 130° C. for 60 minutes.

Thereafter cooled to 85° C. and added 6.9 kg THPA. Thereafter 16.9 kg PTA was added and the temperature raised to 130° C. and kept there for 120 minutes.

Thereafter the reaction mixture was cooled to 110° C. and 20.5 kg water added. The temperature stabilises at approx. 50° C.

The mixture was stirred for further 15 minutes until homogenous.

The resin was cooled and transferred to a storage tank.

Resin solids content 63.4% determined at 200° C. Rest monomers 37% DEA of added, 14% THPA of added, 25% PTA of added. Average molweight about 600.

On a sample, a factory trial was carried out, whereby 4% DEA and 25% solids Acumer 1510 calculated on resin solids, 0.4% of sum solids silane and water to 25% solids content, was added and analysed.

Results of Factory Trial

Binder yield 70%

Delamination strength (EN 1607) 12.1 kPa (Terrenbatts Industri)—Aged 4.3 kPa (70° C./95% RH)

The invention is not limited to the above description, the requested rights are determined by the following claims.

The invention claimed is

1. A process for providing a binder for mineral wool products said process comprising the steps of:
   mixing together under reactive conditions a carboxylic acid with an alkanolamine to provide a resin, wherein the carboxylic acid is selected from a group of di, tri, or tetra, carboxylic acid having a molecular weight of about 1,000 or less, and mixtures thereof, which resin is subsequently mixed with a separate carboxylic acid group containing polymer to form a reaction mixture.

2. The process according to claim 1, wherein the carboxylic acid group containing polymer has a molecular weight lying in the ranges of 1,000-300,000.

3. The process according to claim 1, wherein the carboxylic acid group containing polymer comprises at least one of a polyacrylic acid, polymethacrylic acid, polymaleic acid and co-polymers thereof.

4. The process according to claim 1, wherein the carboxylic acid is a di-carboxylic acid having the general formula:

COOH—$(CR_1R_2)_n$—COOH wherein $n \geq 2$, and wherein $R_1$ and $R_2$ are independently selected from H and a lower alkyl group.

5. The process according to claim 1, wherein the carboxylic acid is selected from the group consisting of adipic acid, citric acid, trimellitic acid, sebacic acid, azelaic acid and succinic acid.

6. The process according to claim 1, wherein the alkanolamine is selected from the group consisting of di- and tri-alkanolamines.

7. The process according to claim 6, wherein the alkanolamine is a secondary beta-hydroxy alkylamine.

8. The process according to claim 1, wherein the alkanolamine is selected from the group consisting of di-ethanolamine, 1-methyldiethanolamine, 1-ethyldiethanolamine, n-butyldiethanolamine, 3-amino-1,2-propanediol, 2-amino-1,3-propanediol and tris(hydroxymethyl)aminomethane.

9. The process according to claim 1, wherein the mole ratio of the carboxylic acid to the alkanolamine in the binder lies in the range of 0.1-1:1-0.1.

10. The process according to claim 1, wherein the weight percentage of the carboxylic acid group containing polymer in the binder lies in the range of 0.5-50.

11. The process according to claim 1, wherein the alkanolamine is firstly heated to a first predetermined temperature whereafter the carboxylic acid is added and the temperature of this mixture raised to a second predetermined temperature.

12. The process according to claim 11, wherein the first predetermined temperature is around 60° C. and wherein the second predetermined temperature is at least about 90° C.

13. The process according to claim 1, comprising the further step of adding at least one of the following to the binder:
   a coupling agent,
   a polymerization accelerator, a curing accelerator and standard mineral wool binder additives.

14. The process according to claim 1, wherein a base is subsequently added to the reaction mixture.

15. The process according to claim 14, wherein the base is selected from the group comprising $NH_3$, diethanolamine (DEA), triethanolamine (TEA), and any of $NH_3$, DEA and TEA mixed with a polyacrylic acid.

16. The process according to claim 15, wherein weight % of base in the resin reaction mixture, calculated by weight of the solids in the reaction mixture, lies in the range of up to 20%.

17. The process according to claim 1, wherein the weight % of the carboxylic acid group containing polymer in the mixture lies in the range up to 25%.

18. The process according to claim 1, further comprising the step of adding a silane, in the range of 0.1%-5% by weight of the resin solids.

19. The process according to claim 11, wherein:
   the carboxylic acid group containing polymer has a molecular weight lying in the range of 1,000-250,000;
   the carboxylic acid has a molecular weight of 500 or less;
   the weight percentage of the carboxylic acid group containing polymer in the binder lies in the range of 10-40%;
   the second predetermined temperature lies in the range of about 95-200° C.;
   and wherein, the process further comprises the steps of subsequently adding a base to the reaction mixture in the range of up to 10% calculated by weight of solids in the reaction mixture, and
   adding a silane in the range of 0.2-3% by weight of the resin solids.

20. The process according to claim 11, wherein:
   the carboxylic acid group containing polymer has a molecular weight lying in the range of 1,000-200,000;
   the carboxylic acid has a molecular weight of 200 or less;
   the weight percentage of the carboxylic acid group containing polymer in the binder lies in the range of 15-30%;
   the second predetermined temperature lies in the range of about 120-150° C.;
   and wherein, the process further comprises the steps of subsequently adding a base to the reaction mixture in the range of 1-5% calculated by weight of solids in the reaction mixture, and
   adding a silane at about 1% by weight of the resin solids.

21. A process for providing a binder for mineral wool products, said process comprising the steps of:
   mixing together under reactive conditions a di-, tri-, or tetra-carboxylic acid having a molecular weight of about 1000 or less with a di- or tri-alkanolamine to provide a resin;
   mixing said resin with a separate carboxylic acid group containing polymer to form a binder.

22. The method of claim 21, wherein said di-, tri-, or tetra-carboxylic acid is selected from the group consisting of adipic acid, citric acid, trimellitic acid, sebacic acid, azelaic acid, and succinic acid.

23. The method of claim 21, wherein said di- or tri-alkanolamine is selected from the group consisting of di-ethanolamine, 1-(m)ethyldiethanolamine, n-butyldiethanolamine, 3-amino-1,2-propanediol, 2-amino-1,3-propanediol, and tris(hydroxymethyl)aminomethane.

24. The method of claim 21, wherein said carboxylic acid group containing polymer is mixed with a base and added to the resin.

25. The method of claim 21, wherein a reaction time for forming the binder is 1-3 hours.

26. The method of claim 21, wherein a cure temperature for forming the binder is 150° C.

27. A method of forming a phenol formaldehyde-free polycarboxylic acid binder solution comprising the steps of:
   mixing a di-, tri-, or tetra-carboxylic acid having a molecular weight of about 1000 or less, a di- or tri-alkanolamine, and a carboxylic acid group-containing polymer binder with agitation to form a mixture;

heating said mixture for a period of time sufficient to form a clear, low viscous liquid having a cure temperature of 150° C.

28. The method of claim 27, wherein said carboxylic acid is selected from the group consisting of succinic acid, citric acid, adipic acid, and trimellitic acid.

29. The method of claim 27, wherein said alkanolamine is diethanolamine.

30. The method of claim 27, wherein said carboxylic acid group containing polymer is mixed with a base and added to the resin.

31. The method of claim 27, wherein a reaction time for forming the binder is 1-3 hours.

* * * * *